July 4, 1933.  J. E. LAKE  1,916,956
AIRCRAFT
Filed Dec. 16, 1931  2 Sheets-Sheet 2
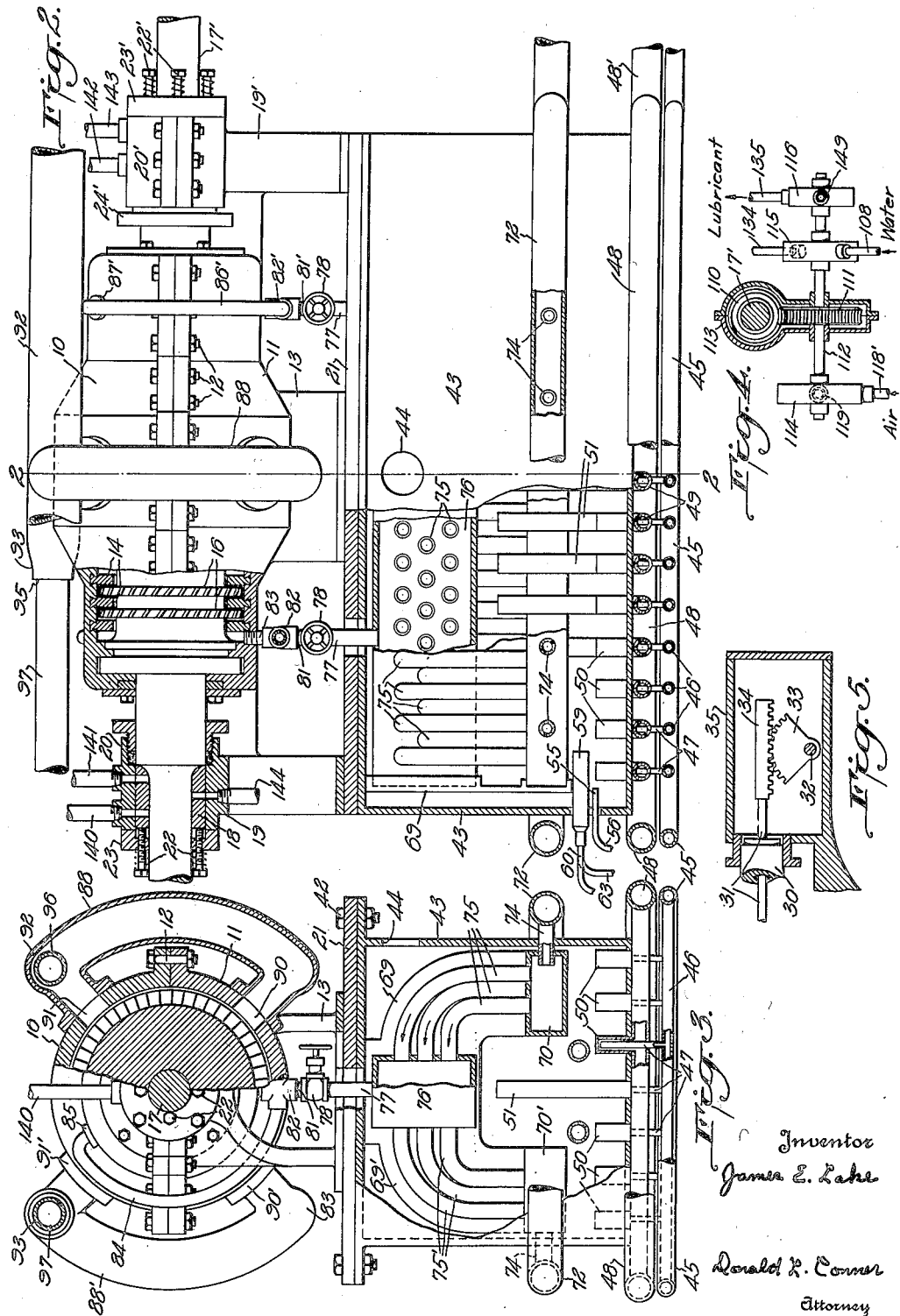
Inventor
James E. Lake
Donald L. Conner
Attorney Patented July 4, 1933

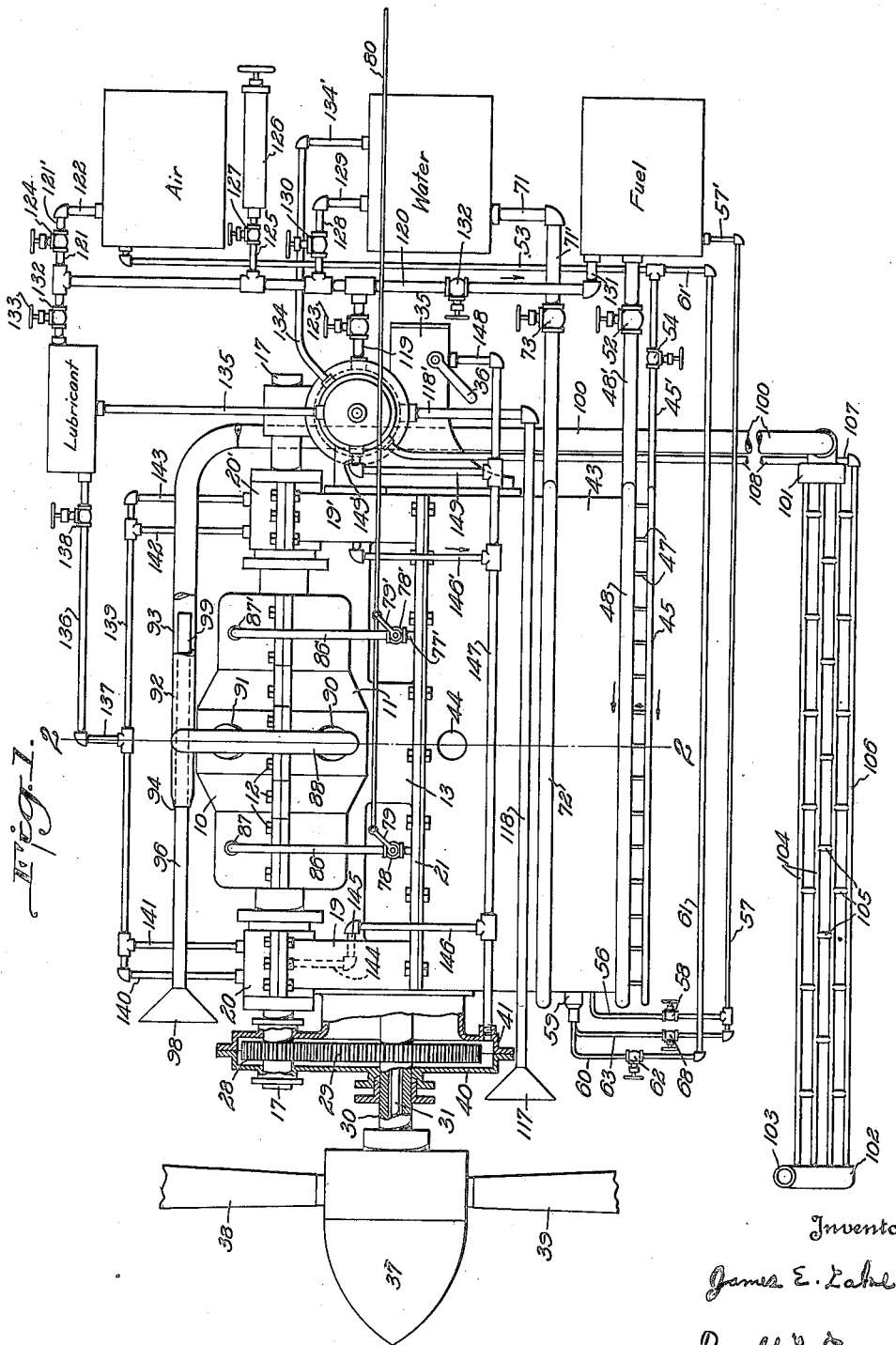

1,916,956

UNITED STATES PATENT OFFICE

JAMES EDWARD LAKE, OF EVANSTON, ILLINOIS

AIRCRAFT

Application filed December 16, 1931. Serial No. 581,481.

This invention relates to aircraft, and more in particular to an improved type of motive power for the same.

At the present time aircraft generally obtain their motive power from gasoline internal combustion engines.

An object of the present invention is to provide an aircraft with an improved type of steam turbine to propel the same.

Another object of this invention is the provision of a new and novel burner and boiler for the steam turbine, and a condenser for the turbine.

Still another object is the provision of a lubricating system for the motive power of the aircraft.

Other objects and advantages of this invention will appear in the following specification, reference being had to the accompanying drawings, in which Fig. 1 is a side plan view of the invention.

Fig. 2 is a side view, with the housing partly broken away to show the burners, boiler, and turbine.

Fig. 3 is a combination end and sectional view taken on line 2—2 of Fig. 2.

Fig. 4 is an end view of the rotor shaft of the turbine showing air, water and lubricant pumps, driven thereby.

Fig. 5 shows the means for actuating an adjusting rod to vary the pitch of the propeller blades.

In the drawings wherein like reference charatcers indicate the same parts throughout the several views, a turbine is shown having an upper casing (10) and a lower casing (11) bolted together as at (12) and resting upon a base (13). Secured to the interior of the casing are the stationary turbine blades (14). A rotor (15) is provided with the moving turbine blades (16). Both ends of the rotor (15) and the turbine casing (10) and (11) are exactly the same. The blades (14) and (16) at the forward end are of opposite pitch from the corresponding blades at the other end of the turbine.

The turbine rotor terminates at either end in shaft portions (17)—(17') which are journalled in shims, one being shown in Fig. 1 at (18) which in turn are supported by the base bearing members (19)—(19'), and encased by the bearing housing caps (20)—(20'). The bases (19) and (19') together with the turbine base (13) rest upon a stage (21). At either bearing are screws (22) and (22') to adjust the shims (18) and so adjust the rotor within the turbine housing. The two part bearing housings (19) (20) and (19') and (20') are sealed at either end by keepers (23) (24) and (23') (24'). To efficiently seal the turbine at the ends where the rotor protrudes from the casing, at each end is provided a sealing ring (25) and a keeper (26) which are retained by bolts (27), screwed into the turbine casings.

To the forward end of shaft (17) is keyed a gear wheel (28) which in turn meshes with a reduction gear (29) keyed to the hollow propeller shaft (30). Within the hollow propeller shaft is a rod (31) which is actuated as shown in Fig. (5) by means of the shaft (32), segmental gear (33) and rack bar (34). This mechanism is encased in a housing (35) and in Fig. 1 is shown a lever (36) for rocking the shaft (32). The rod (31) is moved to actuate the mechanism in housing (37) to vary the pitch of propeller blades (38) and (39).

The gears (28) and (29) are completely encased by the two-part housing (40) and (41) for a purpose hereinafter described.

Suspended from the staging (21) and bolted thereto at (42) is a housing (43) provided with a port in either side at (44) for the escape of gases.

On the outside and surrounding the casing (43) are positioned conduits (45) carrying air under pressure. Transverse of the bottom of the casing (43) and outside thereof, are the pipes (46) connected to the pipes (45). Extending up from the pipes (46) and into the casing, are the branch air conduits (47). Likewise on the outside of casing (43) is provided the conduits (48) carrying fuel under pressure, the branch pipes (49) are arranged transverse of the housing (43) and connects pipe (48) as it extends around the housing. Extending up into the housing (43) are the extensions (49') from the pipes (49) carrying fuel. Pipes (49')

together with pipes (47) constitute the burner (50). The burner pipes (50) extend into the housing (43) and form a grid work of burners therein. In the center of the interior of the housing are provided taller burners (51) of the same construction as the smaller burners (50). The fuel line (48) is supplied by pipe (48') from a fuel reservoir and controlled by valve (52). The air line (45) is supplied with air under pressure by pipe (45') from the air tank through pipe (53) and is controlled by the valve (54).

At (55) is provided a pilot burner which burns pure fuel supplied through pipes (56) and (57) and (57') from the fuel reservoir and is controlled by valve (58). An additional pilot burner (59) which burns both fuel and air under pressure, is supplied by pipe (60), (61) and (61') and (53) controlled by valve (62) with air under pressure. Fuel to pilot burner (59) is supplied through pipes (63) and (57), (57') controlled by valve (68).

Above the burners and supported by the brackets (69) and (69'), which are supported from stage (21), are flash boilers (70)—(70'). Water under pressure from the water reservoir is fed by pipes (71) and (71') to pipe (72) which is controlled by valve (73), and the small pipes (74) which extend through the side wall of housing (43) into the flash boilers (70) and (70'). A series of drier pipes (75) and (75') lead from either flash boiler to a super-heater (76).

From the top of the super-heater, at either end, two pipes (77) and (77') lead to the turbine and are controlled by the valves (78)—(78') which are actuated by means of levers (79) (79'), operated in unison by the rod (80).

Connected to valves (78) and (78') are short pipes (81)—(81') coupled to four-way pipe fittings (82)—(82'). Coupled to these fittings are short conduits (83), only one being shown as in Fig. 3, which lead into the turbine. Also connected to fitting (82) is a conduit (84) leading into the turbine at (85). The corresponding parts to (84) and (85) at the opposite end of the turbine are not shown in the drawings. Likewise coupled to the fittings (82) and (82') are other conduits (86) and (86'), which enter the turbine at (87) and (87'). From the drawings and description it should be clear that three conduits enter the turbine at either end and are spaced 120° apart.

On either side of the turbine and positioned mid-way of its length are provided the manifolds (88) and (88'), each of which are connected with two ports leading from the interior of the turbine, as at (90) and (91), (90') and (91'). Manifold (88) is connected to a conduit (92) and manifold (88') is connected to a conduit (93). Entering conduits (92) and (93) respectively at points (94) and (95) are the conduits (96) and (97) which terminate just behind the propeller in a funnel as shown at (98) in Fig. 1, only one funnel being shown. Conduits (96) and (97) within the conduits (92) and (93) terminate at a point indicated in Fig. 1 at (99).

The conduits (92) and (93) join to form one conduit pipe (100) and lead to a condenser having headers (101) and (102), the latter of which is provided with a vent (103). The condenser is provided with the horizontal condensing pipes (104) and the vertical condensing pipes (105). The condenser may be positioned at any convenient point, as in the wings, or in the fuselage. Connected to the pipes (104) and (105) is the pipe (106) which through pipes (107) and (108) leads back to a pump (115) shown in Fig. 4 and which is to be later described and explained.

Fig. 4 shows a rear end view of the rotor shaft (17') provided with a worm-gear (110) to drive the gear (111) keyed to shaft (112). The worm-gear (110) and gear (111) are encased by the housing (113).

The shaft (112) serves to drive an air pump (114), water pump (115) and lubricant pump (116).

In the front of the machine, directly behind the propeller, is positioned a funnel (117) connected to conduits (118) and (118') leading to the air pump (114). Leading from the air pump (114) is pipe (119) having therein the valve (123) and pipe (120). The upper end of pipe (120) is connected to pipes (121)–(121') and (122) and controlled by valves (124) and leads to the air reservoir. Connected to pipe (120) is provided a pipe (125) connected to a hand air pump (126) for emergency purposes, and controlled by valve (127).

Leading from pipe (120) are pipes (128) and (129) controlled by valve (130), supplying the water reservoir with air under pressure.

The lower portion of the pipe (120) is connected to a pipe (131) and controlled by valve (132) and leads to the fuel reservoir to supply it with air under pressure.

Air under pressure through the upper portion of pipe (120) and pipe (132) controlled by valve (133) is fed to the lubricant reservoir.

Leading from pump (115) is the pipe (134) and (134') carrying water back to the reservoir.

Connected to the pump side of the pump (116) is the pipe (135) connected to the lubricant reservoir. Leading from the lubricant reservoir is a pipe (136) connected to pipe (137) and controlled by valve (138). Connected to pipe (137) is a pipe (139), one end of which is connected to the pipes (140) and (141) to supply lubricant to the rotor bearing in housings (19) and (20). Likewise pipes (142) and (143) supply lubricant to the other rotor bearing. Pipes (144), (145) and (146)—(146') return the lubricant to pipe (147), which supplies lubricant to gears (28) and (29) within the housing (40). Pipe (147) through pipe (148) supplies the mechanism within the housing (35) with lubricant. Through pipe (149) connected to pipe (147) and pipe (149') the lubricant is returned to the pump (116).

*Operation*

Assuming the lubricant, water and fuel tanks to be filled, and air under pressure to have been retained in the air reservoir, for if not, by the operation of a hand pump (126) with all the valves closed except valve (124) and (127) air under pressure may be readily supplied to the reservoir at which time valve (127) is closed and valve (132) is opened to put the fuel reservoir under pressure. Auxiliary pilot burner (55) is now supplied with fuel by opening valve (58) and then lighted. The main pilot burner (59) is now supplied with fuel by opening valve (68) and with air under pressure by opening valve (62). Main pilot (59) is now ignited by the auxiliary pilot (55). Now by opening valves (52) fuel is fed through pipes (48)—(48') and (49)—(49') to the main burners (50) and (51), and by opening valve (54) air under pressure is supplied through pipes (45)—(45'), (46) and (47) to the main burners (50) and (51), which are ignited by the pilot burners (55) and (59).

Valve (130) is now opened to put the water reservoir under pressure and valve (73) is next opened to supply water through pipes (71)—(71'), (72) and (74) to the flash boilers (70) and (70'), which by this time have been sufficiently heated to produce steam as the water is sprayed through pipes (74) into the boilers. The steam rises out of the flash boilers (70) and (70') ascending through the drier tubes (75) and (75'), wherein the steam is dried, to the super heater (76) in which the steam is further heated. When a sufficient steam pressure has been obtained, the valves (78)—(78') are opened by operation of rod (80) to supply steam to either end of the turbine, entering at ports (87)—(87'), (83)—(83') and (85)—(85'), which are arranged at either end of the turbine and spaced 120° apart. The steam entering at either end of the turbine acts on the rotor blades to turn the rotor shaft (17) and then advances toward the center of the turbine where, through the four ports, (90)—(90'), (91) and (91') it leaves entering the manifolds (88)—(88').

The rotor shaft on rotating will at one end, through gears (28) and (29), drive the propeller shaft (30), and at the other end, through worm-gear (110) and gear (111), drives the shaft (112) to operate the air pump (114), the water pump (115), and lubricant pump (116).

At this point in the operation, when the turbine rotor has turned slowly for a brief period, the propeller blades (38)—(39) are given a slight pitch through the actuation of the lever (36) and the subsequent motion imparted to rod (31) which sets into action the propeller pitch varying mechanism in the housing (37).

The pitch of the propeller blades will force air into the funnels as at (98) and through pipes (96) and (97) into the pipes (92) and (93) into which the exhaust from the turbine has entered. The air being forced into pipes (92) and (93) through the pipes (96) and (97) will assure the travel of the exhaust gases and steam through pipe (100) to the condenser. After the exhaust gases and steam have been subjected to the action of the condenser, any uncondensed steam, together with air, will escape through port (103) and the water or condensed steam will be drawn up through pipes (107) and (108) by the pump (115) and returned to the water reservoir by pipes (134)—(134') to be used over again.

Air is forced by the propeller into funnel (117) and carried by conduit (118)—(118') to the air pump (114) which pumps it through pipes (119), (120), (121)—(121') and (122) to the air pressure reservoir.

Lubricant under air pressure, supplied by pipe (132) and controlled by valve (133) is stored in the lubricant reservoir from which through pipe (136) controlled by valve (138) and pipes (137), (139), (140), (141), (142) and (143) it is fed to the rotor bearings in the housings at either end of the turbine. From the bearing housings the lubricant is conveyed by pipes (144), (145), (146) and (146') to pipe (147) which supplies the housings (40) and (35) with the lubricant. Through pipes (149) and (149') the lubricant is returned to the lubricant pump (115) which pumps it by way of pipe (135) back to the lubricant reservoir.

After the propeller has started and the plane is ready to be driven, valves (123), (124), (130) and (132) should be opened.

The speed and power of the aircraft is controlled as follows: By means of fuel valve (52), air valve (54) and water valve (73), the amount of steam produced is regulated, while valves (78) and (78') will control the amount of steam fed to the turbine and its speed. By means of lever (36) the pitch of the propeller can be varied and so regulate the speed of the plane and the power of the unit.

I claim:

1. In combination with an aircraft having a propeller, a steam turbine to drive the same, means to generate steam for said turbine, a condenser associated with said turbine, and an aspirator pipe associated with said propeller to receive air therefrom and to force the exhaust from said turbine to said condenser.

2. In combination with an aircraft having a propeller driven by a steam turbine having a condenser, means for generating steam for said turbine, the same including burners, flash boilers, and drier-tubes, and a superheater, positioned adjacent said burners, reservoirs to supply said burners with fuel and air under pressure, a reservoir to supply said boilers with water under pressure, an air pump driven directly by said turbine to maintain said reservoirs under pressure, and a water pump driven directly by said turbine to return the condensate from said condenser back to said water reservoir.

3. In combination with an aircraft, a steam turbine to drive the same, means for generating steam for said turbine, including a burner and a boiler, an air pump driven directly by said turbine to force fuel and water to said burner and boiler under pressure, and an exhaust manifold having an aspirator tube therein, the same being provided with a funnel portion positioned behind the propeller to force the exhaust from the turbine.

4. In combination with an aircraft having a propeller, a steam turbine to drive the same, a manifold therefor, a condenser associated with said manifold, and an aspirator pipe positioned in said manifold having upon one end thereof a funnel to receive a draft from the propeller to draw the exhaust from the turbine.

In testimony whereof I affix my signature.

JAMES EDWARD LAKE.